United States Patent [19]

Yamaguti et al.

[11] Patent Number: 5,445,722
[45] Date of Patent: Aug. 29, 1995

[54] METHOD AND DEVICE FOR PRODUCING ELECTROLYTIC WATER

[75] Inventors: Shuji Yamaguti, Kawagoe; Masayuki Ukon, Ohmiya; Shiroji Misawa, Kawagoe; Masakazu Arisaka, Yokohama, all of Japan

[73] Assignee: Nippon Intek Co., Ltd., Saitama, Japan

[21] Appl. No.: 199,840

[22] Filed: Feb. 22, 1994

[30] Foreign Application Priority Data

| Feb. 22, 1993 | [JP] | Japan | 5-031970 |
|---|---|---|---|
| Feb. 22, 1993 | [JP] | Japan | 5-031971 |
| Feb. 22, 1993 | [JP] | Japan | 5-031972 |
| Feb. 22, 1993 | [JP] | Japan | 5-031973 |
| Feb. 22, 1993 | [JP] | Japan | 5-031974 |
| Feb. 24, 1993 | [JP] | Japan | 5-035487 |

[51] Int. Cl.$^6$ ............................................. C25B 9/00
[52] U.S. Cl. ................................... 204/229; 204/263; 204/228
[58] Field of Search ............... 204/263, 228, 229, 400, 204/416, 153.22, 153.21

[56] References Cited

U.S. PATENT DOCUMENTS 5,234,563  8/1993  Arai et al. ........................ 204/229

FOREIGN PATENT DOCUMENTS

| 0300793 | 1/1989 | European Pat. Off. |
| 0537528 | 4/1993 | European Pat. Off. |
| 4267987 | 9/1992 | Japan ........................ 204/263 |

OTHER PUBLICATIONS

Patent Abstracts Of Japan, vol. 16, No. 524 (C-1000) 28 Oct. 1992 & JP-A-41 097 488 (Japan Storage Battery Co. Ltd.) 17 Jul. 1992.
Patetn Abstracts Of Japan, vol. 13, No. 399 (C-632) 5 Sep. 1989 & JP-A-11 043 688 (Tatsuo Ikazaki) 6 Jun. 1989.

*Primary Examiner*—Kathryn Gorgos
*Attorney, Agent, or Firm*—Wenderoth, Lind & Ponack

[57] ABSTRACT

Electrolytic water produced by controlling the electrolytic degree of electrolytic water discharged from an electrolyzer having anode and cathode chambers partitioned by an ion-permeable barrier membrane so as to produce electrolytic water having the desired pH value in accordance with the pH value, electric conductivity, oxidation-reduction potential, and ion concentration. The electrolytic degree of the electrolytic water is controlled by injecting a regulated electrolyte solution into raw water to be supplied into the electrolyzer, regulating the flow quantity of the raw water and/or the electrolytic water discharged from the electrolyzer, and/or varying the capacity of the anode and/or cathode chamber.

3 Claims, 7 Drawing Sheets

METHOD AND DEVICE FOR PRODUCING ELECTROLYTIC WATER

BACKGROUND OF THE INVENTION

1. Field of the Invention

This invention relates to a method and device for producing electrolytic water such as acidic water usable as rinsing or disinfecting water and alkaline water which may be used as drinking water with high efficiency, and, more particularly, to an electrolytic water producing method and device capable of suitably controlling electrolysis of water to efficiently produce the acidic and/or alkaline water having a desired electrolytic degree.

2. Description of the Prior Art

In general, it has been known that acidic electrolytic water having low pH value showing acidic properties can be used as rinsing or disinfecting water in a food or medical field. However, such acidic water being low in acidity could not be stably produced in large quantities with ease.

A conventional water-electrolyzing device for producing electrolytic water fundamentally comprises an electrolyzer having anode and cathode chambers which are partitioned by an ion-permeable barrier membrane, and anode and cathode electrodes set in the anode and cathode chambers. When applying an electric current to the anode and cathode electrodes, raw water introduced into the electrolyzer is electrolyzed, so that the water in the cathode chamber is increased in pH value to be made alkali, and at the same time, the water in the anode chamber is decreased in pH value to be made acidic. Thus, acidic water having the low pH value and alkaline water having the high pH value can be produced simultaneously. It has, however, been difficult to continuously produce the acidic water and alkaline water having the desired electrolytic degree in large quantities. Incidentally, the electrolytic degree signifies the pH value, electric conductivity, oxidation-reduction potential and/or ion concentration of water.

Typical service water to drink has a small electric conductivity (EC value) of about 100 to 200υ/cm and substantial neutrality of about pH 6.5 to 8. The electrolysis in the electrolyzer can possibly be more activated by increasing the electric current applied to the anode and cathode electrodes, to thereby produce a large quantity of electrolytic water. However the voltage must be increased in order to produce the electrolytic water in large quantities because the electric current is reluctant to flow through the pure drinking water being low in electric conductivity, thus consuming a large amount of electricity.

Furthermore, the conventional general purpose water-electrolyzing device has suffered a drawback in that only slightly acidic electrolytic water having about pH 4.0 to 5.0 at most can be produced. Such water of a weak acid cannot suitably be used as rinsing or disinfecting water.

OBJECT OF THE INVENTION

An object of this invention is to provide a method and device capable of efficiently producing acid water and alkaline water in large quantities in succession by electrolyzing raw water without using a large amount of electric power.

Another object of this invention is to provide a method and device capable of readily producing highly disinfecting water of a strong acid of less than pH 3, desirably pH 1.5 to 2.6 with high efficiency.

Still another object of this invention is to provide a method and device capable of producing acidic water and alkaline water each having a desired electrolytic degree with high efficiency in accordance with the flow quantity and/or electrolytic degree of raw water and/or electrolytic water resultantly produced.

SUMMARY OF THE INVENTION

To attain the objects described above according to the present invention, there is provided a method for efficiently producing electrolytic water having a desired electrolytic degree, which comprises supplying raw water into an electrolyzer which is partitioned into an anode chamber with an anode electrode and a cathode chamber with a cathode electrode by an ion-permeable barrier membrane while adding an electrolyte solution to the raw water, applying an electric current to the anode and cathode electrodes, and controlling electrolysis in accordance with an electrolytic degree of the raw water and/or electrolytic water resultantly produced.

Further, the present invention provides a device for efficiently producing electrolytic water having a desired electrolytic degree, comprising an electrolyzer having an anode chamber with an anode electrode and a cathode chamber with a cathode electrode which chambers are partitioned by an ion-permeable barrier membrane, a raw water supply passage for supplying raw water to the electrolyzer, at least one flow control means provided on the raw water supply passage, means for injecting electrolyte solution to the raw water flowing through the raw water supply passage, discharge passages connected to the respective anode and cathode chambers, at least one flow control means provided on at least one of the discharge passages, sensor means provided on the raw water supply passage and discharge passages for detecting the electrolytic degree of the raw water and/or electrolytic water, and a control unit for controlling the electrolysis in the electrolyzer, supply flow quantity of raw water and/or discharge flow quantity of electrolytic water in accordance with at least one signal output by the sensor means.

The raw water introduced into the electrolyzer is electrolytically decomposed into acidic water and alkaline water by applying an electric current to the anode and cathode electrodes in the electrolyzer. The acidic water is discharged from the anode chamber, and the alkaline water is discharged from the cathode chamber in succession.

As the electrolyte solution to be added to the raw water, there may be used a chloric electrolyte solution such as salt water. With addition of the electrolyte solution to the raw water, the electric conductivity of the raw water is increased to permit a large electric current to flow through the raw water in the electrolyzer, thereby activating the electrolysis of the water.

By controlling the electrolysis on the basis of the electric conductivity and/or oxidation-reduction potential detected from the raw water and/or electrolytic water by use of the sensor means, the pH value and/or discharge flow quantity of the acidic and/or alkaline water can be effectively controlled.

The strength of electrolysis can be freely controlled by regulating the discharge flow ratio of the acidic water to the alkaline water and/or the quantity of electrolytic load electricity applied to the electrolyzer in accordance with the electrolyzing condition or the electrolytic degree of the electrolytic water discharged from the electrolyzer. The discharge flow ratio of the acidic water to the alkaline water can be varied by moving the barrier membrane by which the anode and cathode chambers are partitioned to vary the capacities of the anode and cathode chambers. Also, the discharge flow ratio of the acidic water to the alkaline water can be varied by controlling the flow control means provided on at least one of the discharge passages from the anode and cathode chambers.

Other and further objects of this invention will become obvious upon an understanding of the illustrative embodiments about to be described or will be indicated in the appended claims, and various advantages not referred to herein will occur to one skilled in the art upon employment of the invention in practice.

DESCRIPTION OF THE PREFERRED EMBODIMENTS

This invention will become more fully understood from the detailed description given hereinbelow and the accompanying drawings which are given by way of illustration only, and thus are not limitative of the present invention.

The electrolytic water producing device of the present invention can produce electrolytic water having the desired pH value by effectively controlling electrolysis in accordance with the electrolytic degree of the electrolytic water such as pH value, electric conductivity (EC value), oxidation-reduction potential (ORP value), and ion concentration. One embodiment of the electrolytic water producing device of this invention will be described hereinafter with reference to the conceptual illustration of FIG. 1.

Figure 1:
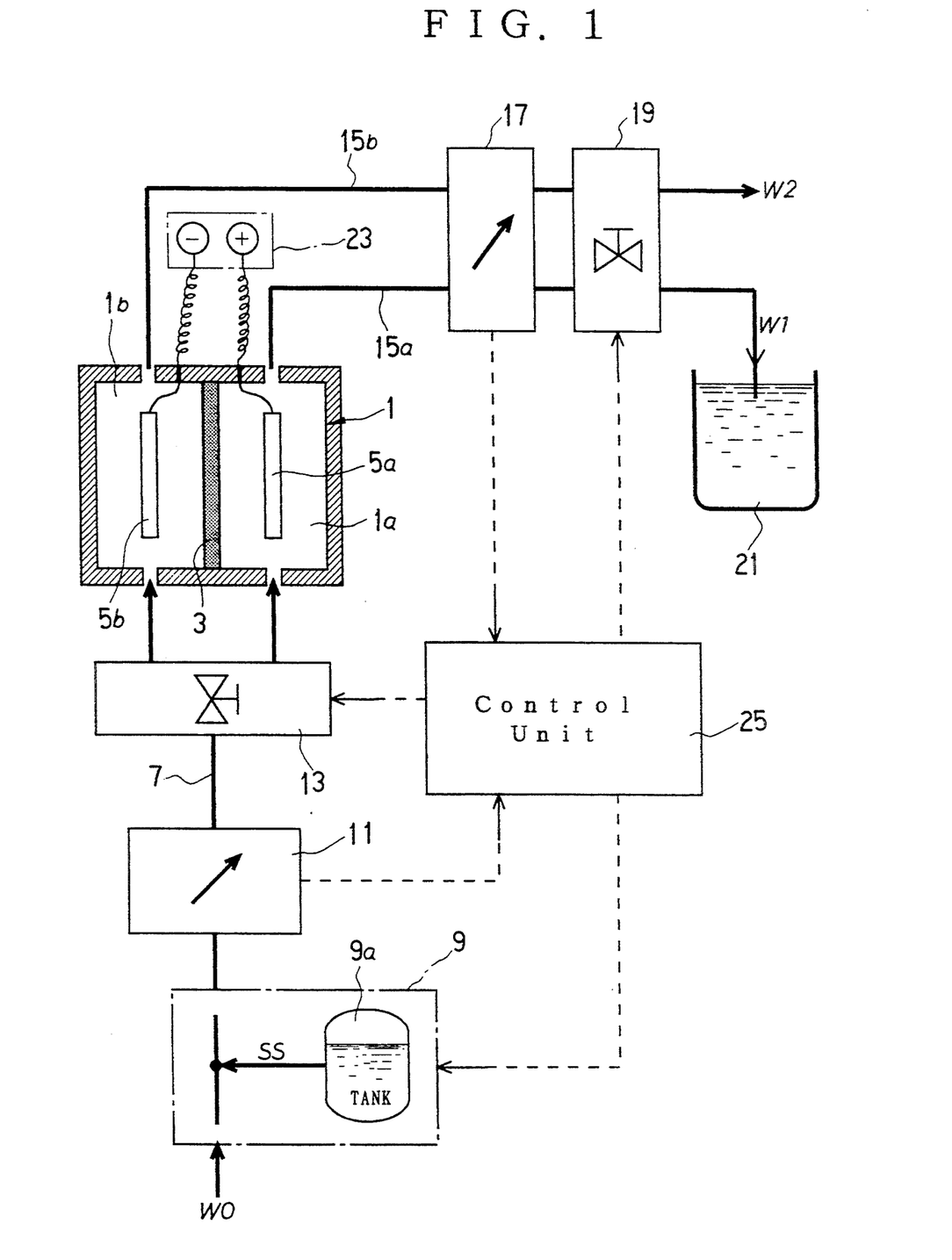
FIG. 1 is a diagrammatic illustration schematically showing an electrolytic water producing device embodying the novel concepts of the present invention.

The electrolytic water producing device comprises a closed electrolyzer 1 having an anode chamber 1a and an cathode chamber 1b which are partitioned by an ion-permeable barrier membrane 3, a raw water supply passage 7 connecting with the anode chamber 1a and cathode chamber 1b for introducing raw water WO into the anode chamber 1a and the cathode chamber 1b, electrolyte injection means 9 for injecting an electrolyte solution SS contained in a tank 9a into the raw water supply passage 7 to adulterate the raw water with the electrolyte solution SS, sensor means 11 provided on the raw water supply passage 7 for measuring the EC value and/or the flow quantity of the raw water WO, at least one flow control means 13 provided on the raw water supply passage 7, electrolytic water discharge passages 15a and 15b connecting to the anode chamber 1a and cathode chamber 1b for discharging electrolytic water (acidic water W1 and alkaline water W2) produced as the result of the electrolysis from the anode and cathode chambers, at least one sensor means 17 provided on at least one of the discharge passages 15a and 15b for measuring the flow quantity and/or the electrolytic degree of the produced electrolytic water, flow control means 19 provided on at least one of the discharge passages, and a reservoir 21 for storing the electrolytic water discharged from the electrolyzer 1.

Service water to drink or other pure water may be used as the raw water and is introduced into the respective anode chamber 1a and cathode chamber 1b via the supply passage 7.

As the electrolyte solution SS, there may be used a chloric electrolyte solution such as a solution including salt (NaCl), KCl, HCl, HClO, $HClO_3$, $KClO_3$ and/or NaClO. By adding the electrolyte solution SS to the raw water WO, the electric conductivity of the raw water can be increased to allow a large electric current to flow through the raw water, thus promoting the electrolysis.

To the anode electrode 5a set in the anode chamber 1a and the cathode electrode 5b set in the cathode chamber 1b, an electric current for causing the electrolysis is given from an electric power source 23.

In the drawing, reference numeral 25 denotes a control unit for controlling the aforesaid flow control means 13, 19 and/or the electrolyte injection means 9 in accordance with the flow quantity, EC value and ORP value of the raw water and/or electrolytic water, which are detected by the sensor means 11 on the supply passage 7 and the sensor means 17 on the discharge passage 15a.

The structure and arrangement of the electrolytic water producing device of the invention are somewhat altered according to the controlling factors such as the flow quantity and EC value of the raw water, the flow quantity, EC value and ORP value of the electrolytic water resultantly produced, which are controlled by the control unit 25, the conditions of the desired electrolytic water, and the operating conditions of the flow control means 13, 19 and the electrolyte injection means 9. Some embodiments of the electrolytic water producing device of the invention will be described in detail hereinbelow.

Figure 2:
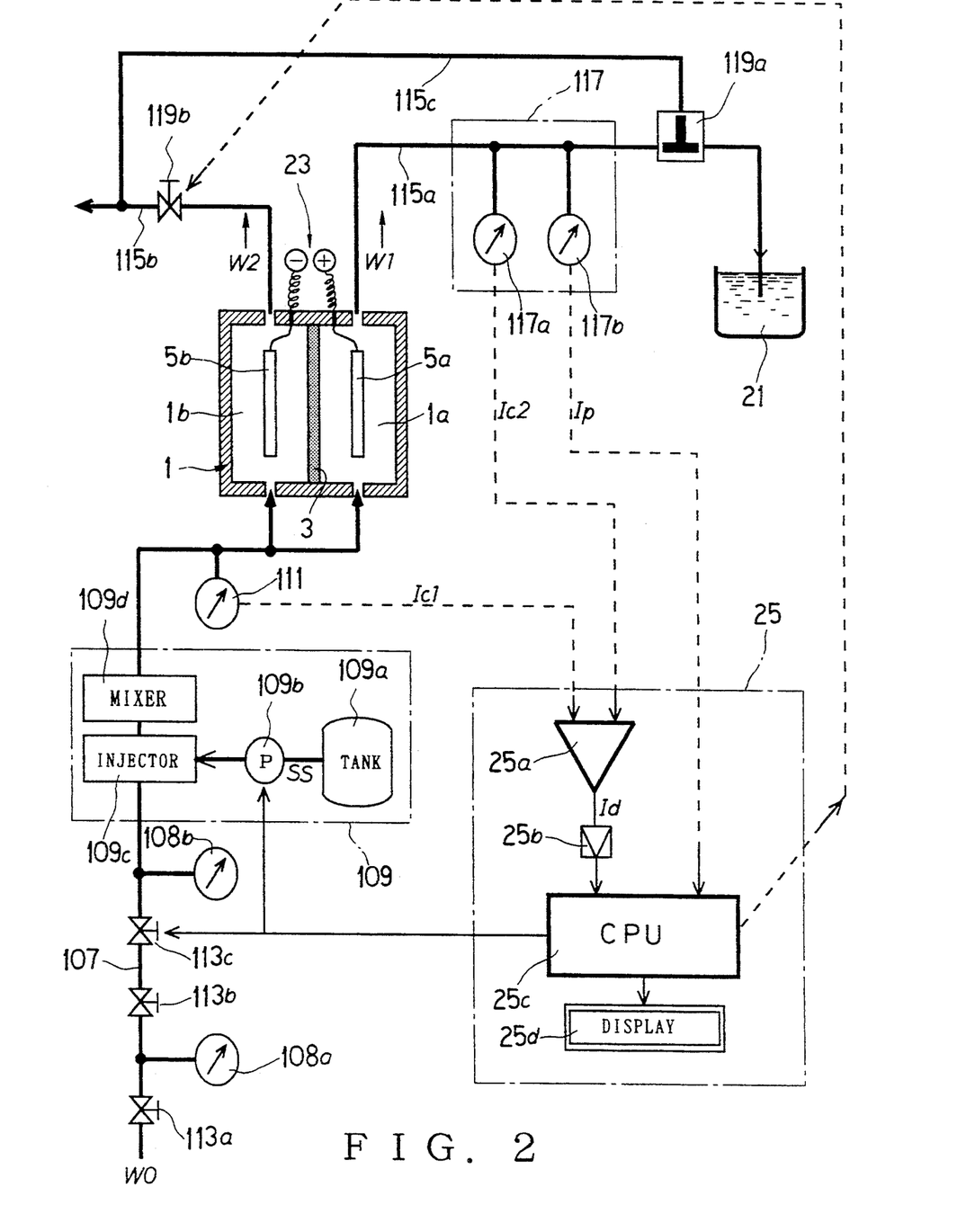
FIG. 2 is a schematic view showing a second embodiment of the electrolytic water producing device of this invention.

The electrolytic water producing device illustrated in FIG. 2 as a second embodiment of the invention has a function of controlling the electrolytic degree in accordance with the quantity of electrolytic load electricity applied to the anode and cathode electrodes while detecting the electrolytic condition in the electrolyzer or the electrolytic degree of the electrolytic water discharged from the electrolyzer. The control of the electrolytic load electricity can be performed by controlling the flow ratio of the acidic water discharged from the anode chamber 1a to the alkaline water discharged from the cathode chamber 1b. Thus, the desired amount of acidic water having the desired pH value can be produced.

On the raw water supply passage 107 for supplying the raw water to the anode chamber 1a and the cathode chamber 1b, which are partitioned by the barrier membrane 5a in the electrolyzer 1, there is arranged a flow control system. The flow control system in this embodiment includes a pressure reducing valve 113a, a cut-off value 113b and a flow control valve 113c. In addition, the supply passage 107 is provided with a pressure gauge 108a and a flow meter 108b so as to regulate the flow quantity of the raw water to be supplied to the electrolyzer.

The electrolyte injection means 109 in this embodiment is located on the downstream side of the flow meter 108b, and includes a tank 109a for storing the electrolyte solution SS, a quantitative pump 109b for sending out the electrolyte solution SS from the tank 109a, an injector 109c for injecting the electrolyte solution SS into the raw water supply passage 107, and a mixer 109d for mixing the electrolyte solution SS with the raw water WO.

The electrolyte solution SS for controlling the electric conductivity of the raw water may be made of a chloric electrolyte solution. In particular, an about 10% salt solution may be preferably used. The electrolyte solution stored in the tank 109a is injected into the supply passage 107 by use of the quantitative pump 109b and then mixed with the raw water WO by the mixer 109d. Thus, the raw water well mixed with the electrolyte solution SS is introduced into the electrolyzer 1.

As the sensor means placed on the raw water supplying side, an electric conductivity sensor (EC sensor) 111 for detecting the electric conductivity (EC value) of the raw water and outputting an electric conductivity signal (EC signal) Ic1 is disposed on the downstream side of the injection means 109. By applying an electric current from the power source 23 to the anode and cathode electrodes 5a and 5b in the anode and cathode chambers 1a and 1b, the raw water WO is electrolyzed to be separated into acidic water W1 and alkaline water W2. The acidic water W1 and alkaline water W2 are respectively discharged through the discharge passages 115a and 115b.

The acidic water W1 from the anode chamber 1a flows to the reservoir 21 through a three-way valve 119a in the normal condition. By operating the three-way valve 119a, the desired amount of acidic water W1 can be arbitrarily discharged to the discharge passage 115b through a bypass 115c. The acidic water W1 finally stored in the reservoir 21 can be used for rinsing, disinfecting or other purposes.

The discharge passage 115b is provided with a flow control valve 119b through which the alkaline water W2 produced in the cathode chamber 1b flows out. This alkaline water W2 may be used for drinking.

The sensor means 117 on the discharge passage 115a includes an electric conductivity sensor (EC sensor) 117a for measuring electric conductivity (EC value) of the acidic water W1 and issuing an EC signal Ic2, and an oxidation-reduction potential sensor (ORP sensor) 117b for measuring oxidation-reduction potential of the acidic water W1 and issuing an ORP signal Ip.

The EC signal Ic1 outputted from the EC sensor 111 disposed on the supply passage 107 and the EC signal Ic2 outputted from the EC sensor 117a disposed on the discharge passage 115a are fed to the control unit 25. Upon comparing the EC signal Ic1 with the EC signal Ic2 in a comparator 25a, a difference signal Id resultantly calculated is fed to an arithmetic processor (CPU) 25c through an amplifier 25b.

The CPU 25c further receives the ORP signal Ip from the ORP sensor 117b. In the CPU 25c, predetermined control reference values concerned in the electric conductivity and oxidation-reduction potential are preset, so that the system including the flow control valve 113c, quantitative pump 109b, and flow control valve 119b can be controlled in accordance with the aforenoted difference signal Id and ORP signal Ip. To put it concretely, in accordance with the difference signal Id and ORP signal Ip, the flow quantity of the raw water and the amount of electrolyte solution to be added to the raw water are regulated, and the flow control valve 119b on the discharge passage 115b is controlled.

When the electrolytic degree of the acidic water W1 is insufficient, i.e. the difference in electrolytic degree between the raw water WO and the acidic water W1 is too small, the pump 109b is controlled so as to increase the amount of the electrolyte solution SS to be added to the raw water, and simultaneously, the flow control valve 113c is throttled, consequently to actively electrolyze the raw water in the electrolyzer 1. Thus, the acidic water W1 having the desired electrolytic degree can be obtained. Similarly, by controlling the flow control means and the injection of the electrolyte solution in accordance with the measured oxidation-reduction potential, the electrolytic water having the desired pH value can easily be produced. Moreover, since the injection of electrolyte solution brings about active electrolysis of the raw water, the electrolytic water of a strong acid having a strongly sterilizing power can be obtained.

Although the quantitative pump 109b is used for injecting the electrolyte solution SS into the raw water supply passage 107, a venturi-type electrolyte solution injector having a contracted portion may be substituted for the pump 109b. That is, a conduit from the tank 109a is connected to the contracted portion of the aforesaid venturi-type injector at which the flow rate of the raw water is increased to give rise to negative sucking pressure, so that the electrolyte solution SS stored in the tank 109a is forcibly sucked into the supply passage 107 by the negative sucking pressure. In the case of utilizing the venturi-type injector, the conduit extending from the tank 109a to the supply passage 107 may preferably be provided with a flow control valve, so that the flow quantity of the electrolyte solution SS can be controlled in accordance with the pH value or oxidation-reduction potential of the raw water WO. In either case, the raw water WO having the desired concentration of electrolyte solution can be introduced into the electrolyzer 1.

By applying an electrolytic current between the electrodes 5a and 5b in the electrolyzer into which desirably regulated raw water is supplied, cations in the raw water aggregate in the cathode chamber 1b through the barrier membrane 3, and anions aggregate in the anode chamber 1a. Thus, the acidic water W1 with low pH value containing plenty of anions such as $Cl^-$ is produced in the anode chamber 1a.

The control of the pH value and/or electric conductivity of the acidic water W1 is performed by operating the flow control valve 119b in the manner described below.

The acidic water W1 produced in the anode chamber 1a is increased in its electric conductivity by the active electrolysis carried out with application of large electric power. As a result, the acidic water W1 is increased in pH value and made strongly acidic. On the other hand, the alkaline water W2 produced in the cathode chamber 1b is discharged through the discharge passage 115b. By throttling the flow control valve 119b, the pH value of the alkaline water W2 varies. That is, the alkaline water W2 is increased in its pH value with decreasing its flow rate. Correlatively, the pH value of the acidic water W1 produced in the anode chamber 1a varies with that of the alkaline water W2. Thus, the pH value, electric conductivity and oxidation-reduction potential of the acidic water can be controlled arbitrarily.

Accordingly, reference data of electrolytic degree of the raw water and the electrolytic water such as electric conductivity, oxidation-reduction potential and pH value, and the flow rates of the raw water and electrolytic water are previously memorized in the control unit 25, so that the control system including the flow control valves can be controlled in accordance with measured data fed from the sensor means on the basis of the predetermined reference data.

The operating conditions of the control system and the measured data from the sensor means are displayed on a display 25d for confirmation.

A test for evaluating the electrolytic water producing device of the invention was carried out and has revealed the excellent function of the invention as noted below.

The raw water to which a 10% salt solution is added at the ratio of 1 liter of salt solution to 100 liters of raw water was supplied into the electrolyzer and electrolyzed by applying electricity of 16 V and 30 A. Consequently, about 3.6 liters of acidic water having pH 2.6 could be produced per minute. The electrolysis for producing 1 liter of acidic water consumed about 1 kW.

When the flow quantity of the raw water was changed, 3.6 liters of acidic water having pH 2.6 could be obtained from the raw water containing 1000 ppm of NaCl by applying electricity of 16 V and 30 A (480 W) to the raw water.

When the flow quantity was unchanged, 1 liter of acidic water could be obtained from the raw water containing no NaCl with electricity of 1 kW.

Thus, according to the present invention, a large quantity of strongly acidic water having the desired pH value can be readily produced with low electric power in succession. If the acidic water having a larger pH value than pH 2.6, e.g. pH 3.0 exhibiting relatively weak acidity, is required, the mixing ratio of electrolyte solution to the raw water may be decreased, or the amount of acidic water produced may be increased without changing the electricity by controlling the flow quantity of alkaline water produced at the same time.

Although the control for producing the desired acidic water is mainly described hereinbefore, the pH value of alkaline water W2 produced from the cathode chamber 1b can of course be controlled by providing a flow control valve similar to the valve 119b on the discharge passage 115a for the acidic water W1 in the reversible manner. In this case, a large quantity of alkaline water can be produced with small electrical power. Also, the control of the flow ratio of the alkaline water and acidic water can be performed by providing distributing means on both discharge passages for distributing the discharged electrolytic water in the fixed total amount.

As is apparent from the foregoing, according to the present invention, the electrolysis of water can be easily accelerated by adding the electrolyte solution to the raw water, thereby making it possible to effectively produce a large quantity of electrolytic water in succession with a small amount of electricity at a low cost. Furthermore, strongly acidic water of less than pH 3 can be obtained by controlling the electric conductivity and pH value of the electrolytic water and the flow ratio of the acidic water and alkaline water. By adding chlorine to the raw water, the acidic water abundantly containing chlorine, hypochlorous acid and/or disinfectant oxygen can be produced and used as a rinsing or disinfectant solution having a strong sterilizing power.

Figure 3:
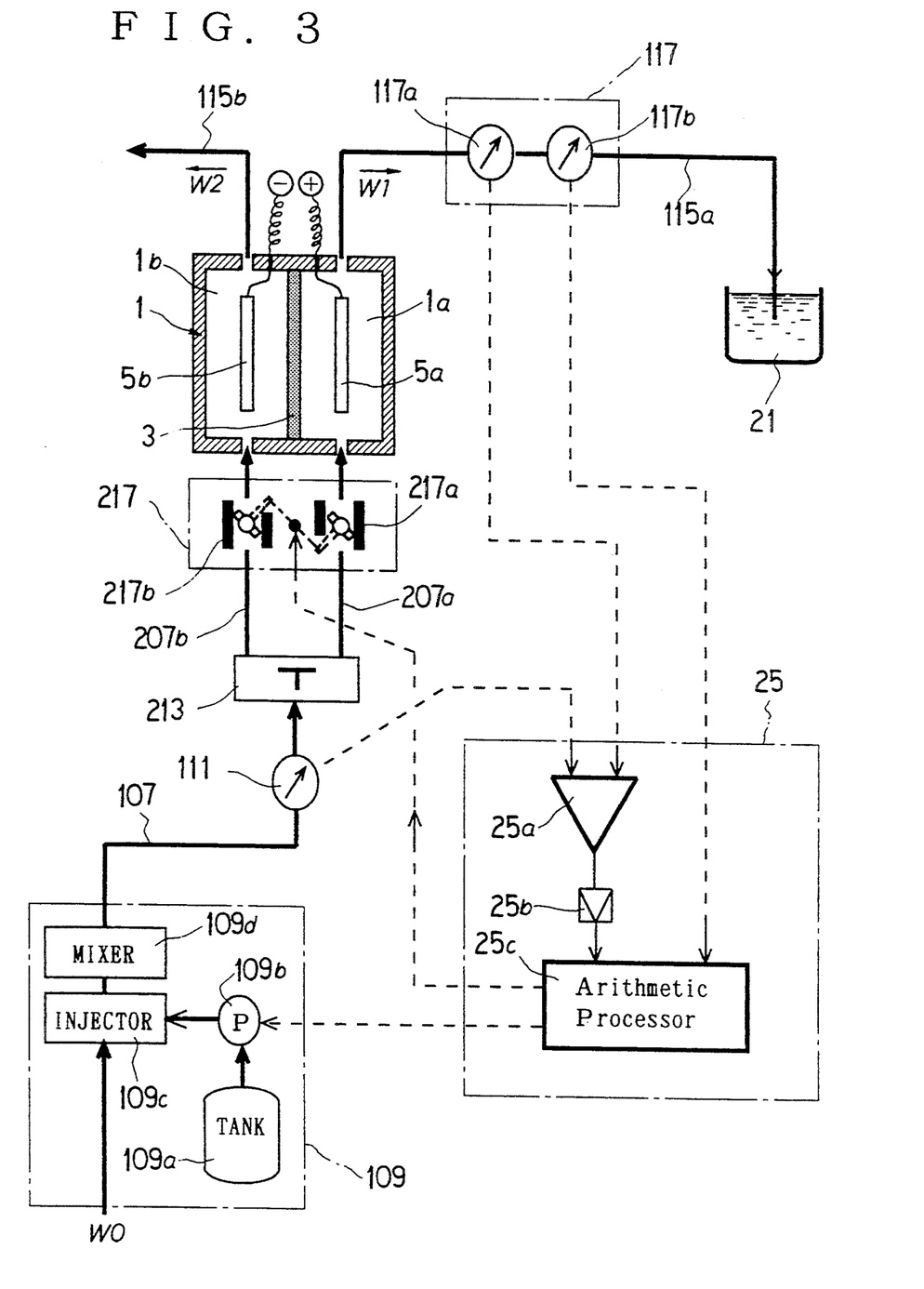
FIG. 3 is a schematic view showing a third embodiment of the device of this invention.

The electrolytic water producing device schematically shown in FIG. 3 is a third embodiment of this invention, in which a three-way valve 213 and a quantitative distributing valve 217 are provided on a raw water supply passage 107. The identical or similar components of this embodiment are denoted by the same numerical symbols in the foregoing embodiments. In describing the third embodiment, the same components as in the first and second embodiments are not described for the sake of simplicity in description. This is the same with the following descriptions of the fourth to seventh embodiments.

The quantitative distributing valve 217 comprises raw water supply pipes 207a and 207b diverged from the supply passage 107 and leading to the anode chamber 1a and the cathode chamber 1b so as to introduce the raw water into the anode and cathode chambers 1a and 1b in the fixed total amount. The quantitative distributing valve 210 is operated so as to control the total amount of the raw water to be supplied to the electrolyzer 1. Although the raw water supplied into the anode chamber 1a via the supply tube 207a correlates closely with that supplied into the cathode chamber 1b via the supply tube 207b, the relation between the flow quantity Qa of the raw water into the anode chamber 1a and the flow quantity Qb of the raw water into the cathode chamber 1b is expressed by the following equation:

$$k \cdot Qa + (-k) \cdot Qb = \text{constant}, \ (k \text{ is } 0 \sim \text{Maximum}) \quad (1)$$

The distributing valve 217 is controlled by the control unit 25 on the basis of the difference between the electrolytic degree of the raw water detected by the EC sensor 111 and the electrolytic degree of the discharged electrolytic water detected by the electric conductivity sensor (EC sensor) 117a or data of electrolytic degree and/or oxidation-reduction potential detected by the EC sensor 117a and/or ORP sensor 117b, so as to regulate the flow quantity of the raw water supplied into the anode chamber 1a and the cathode chamber 1b in the electrolyzer.

The regulation of the electrolytic degree may be carried out in the same manner as the second embodiment touched upon above. That is, when the acidity of the acidic water W1 from the anode chamber 1a is too low, the distributing valve 217 is controlled so as to decrease the flow quantity of the raw water supplied to the anode chamber 1a, thereby to heavily acidify the raw water. As a result, the acidity of the acidic water W1 discharged from the anode chamber 1a is strengthened. On the other hand, when the acidity of the acidic water W1 is too high, conversely, the flow quantity of the raw water to be supplied to the anode chamber 1a may be increased.

Although the distributing valve 217 is conceptually illustrated in FIG. 3 as composed of a pair of interlocking control valves 217a and 217b, it is a matter of course that a three-way valve having a single switching rotor capable of quantitatively distributing the raw water, or any other distributing valves can be used instead of the valve 217.

Figure 4:
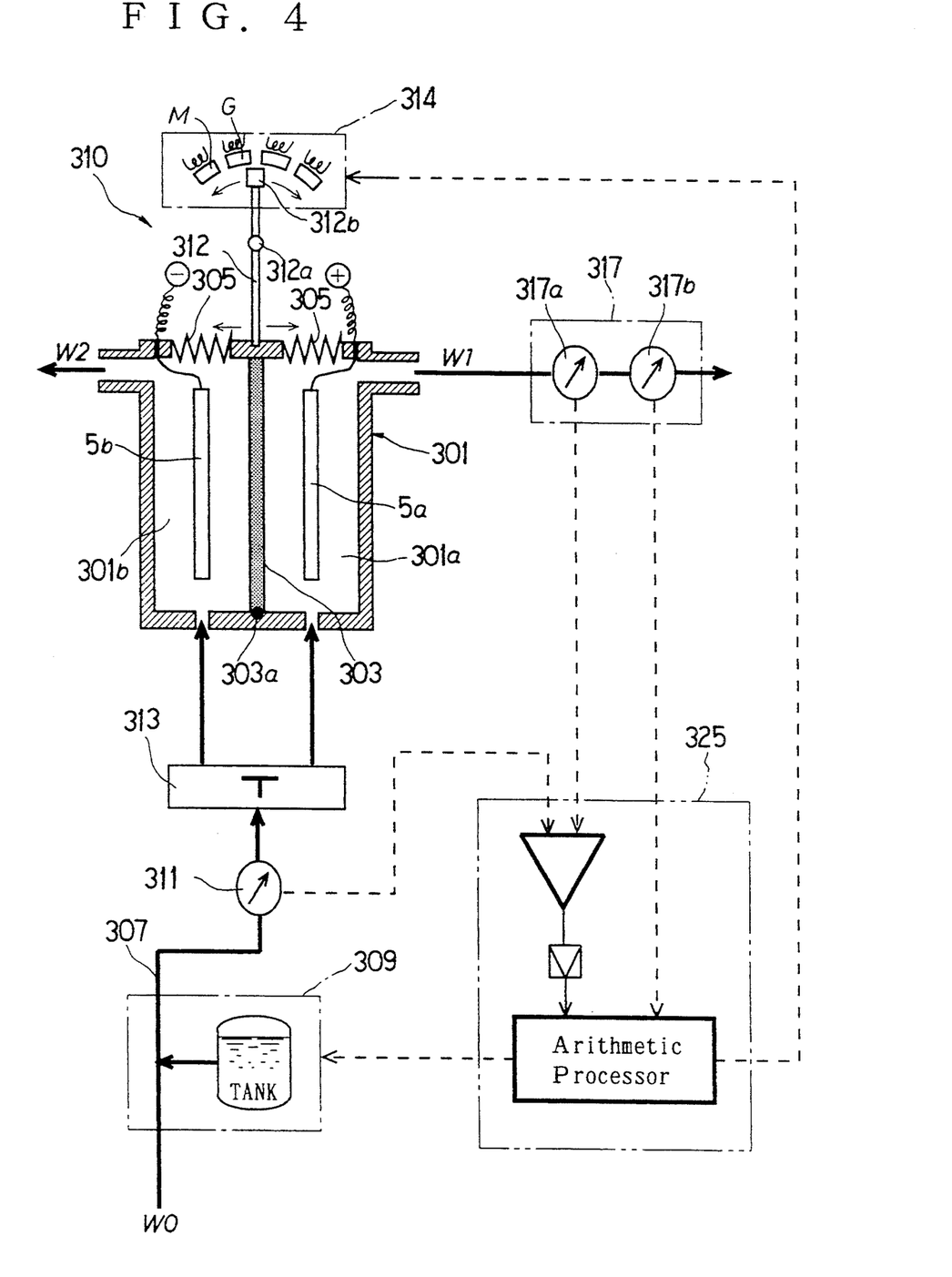
FIG. 4 is a schematic view showing a fourth embodiment of the device of this invention.

The electrolytic degree of the electrolytic water produced in the electrolyzer can be controlled by varying the capacity of the anode chamber and/or cathode chamber. To accomplish this, the fourth embodiment shown in FIG. 4 is provided with capacity varying means 310 for varying the flow quantity of the acidic water W1 discharged from the anode chamber 301a in the electrolyzer 301 relative to the alkaline water W2 from the cathode chamber 301b.

In this embodiment, the barrier membrane 303 is movably fixed at its lower end by a fulcrum member 303a placed on the bottom of the electrolyzer 1 so that it can tilt laterally, and resiliently held at its upper end by spring means 305 so as to take its position at the center of the electrolyzer in its usual state.

The capacity varying means 310 includes a rotating lever 312 rotatably supported at the fulcrum 312a, and electromotive driving means 314 for driving the rotating lever 312. The rotating lever 312 is connected at its lower end to the barrier membrane 303, and provided at its upper end with a magnetic yoke 312b. Opposite to the orbit along which the magnetic yoke 312b moves around the fulcrum 312a, a plurality of electromagnets MG are arranged in an arc. When one of the electromagnets MG is excited, the magnetic yoke 312b is magnetically attracted thereto, thus rotating the rotating lever 312 around the fulcrum 312a. As a result, the barrier membrane 303 tilts to vary correlatively the capacities of the anode chamber 301a and the cathode chamber 301b.

The capacity varying means 310 is controlled by the control unit 325 on the basis of the acidity of the raw water WO measured by an acidity sensor 311 and the electrolytic degree of the acidic water W1 discharged from the electrolyzer 301 which is measured by a sensor means 317 including an acidity sensor 317a and/or an ORP sensor 317b. That is, when the acidity of the acidic water W1 is lower than the predetermined value, the electromagnet MG located on the left side in the electromotive driving means 314 is excited to magnetically attract the magnetic yoke 312b and rotate the rotating lever 312 counterclockwise around the fulcrum 312a in FIG. 4, consequently tilting rightward the barrier membrane 303. Thus, the capacity of the anode chamber 301a is reduced to increase the acidity of the water in the anode chamber 301a. When the acidity of the acidic water W1 produced in the anode chamber 301a is too strong, the capacity of the anode chamber 301a may be increased in the reverse manner.

It is desirable to control the electrolysis effected in the electrolyzer 301 by regulating the flow quantity of the electrolyte solution supplied from the electrolyte injection means 309 while controlling the pH value of the electrolytic water W1 and/or water W2 discharged from the electrolyzer by correlatively varying the capacities of the anode and cathode chambers 301a and 301b as specified above.

Figure 5:
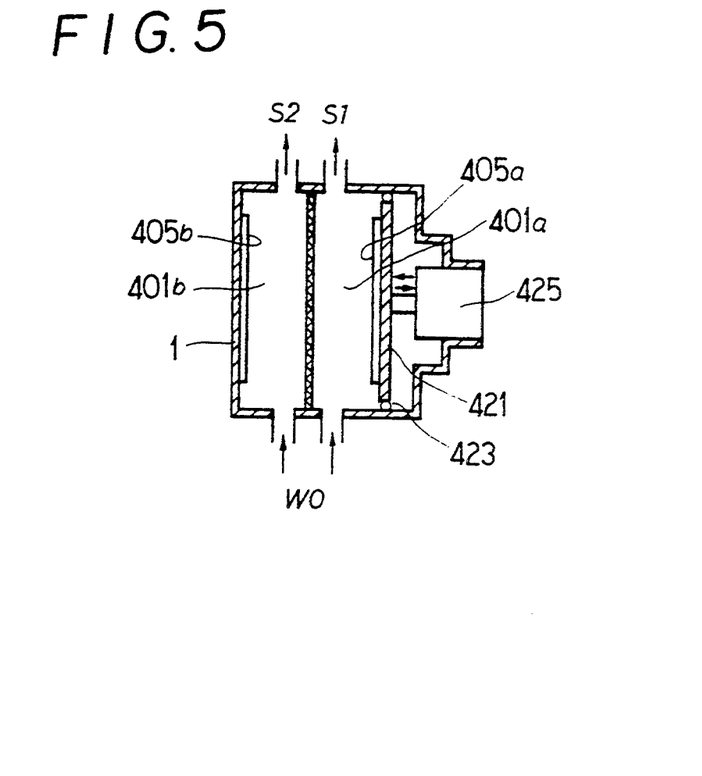
FIG. 5 is a schematic view showing a fifth embodiment in which the electrolyzer used in the device of this invention is modified.

The fifth embodiment shown in FIG. 5 has a modified capacity varying means having a movable side wall 421 in the anode chamber 401a of the electrolyzer 401. The periphery of the movable side water 421 is held watertightly by a sealing member 423 and moved in the lateral direction in the anode chamber 401a by a driving unit 425 so as to vary the capacity of the anode chamber 401a independent of the cathode chamber 401b.

In this embodiment, an anode electrode 405a is attached to the movable side wall 421a, and a cathode electrode 405b is fixed on the side wall of the cathode chamber 401b.

Also in this embodiment, the acidic water W1 and alkaline water W2 having the desired pH values can easily be produced by varying the capacity of the anode chamber 401a relative to the cathode chamber 401b in the same manner as the fourth embodiment described above.

Figure 6:
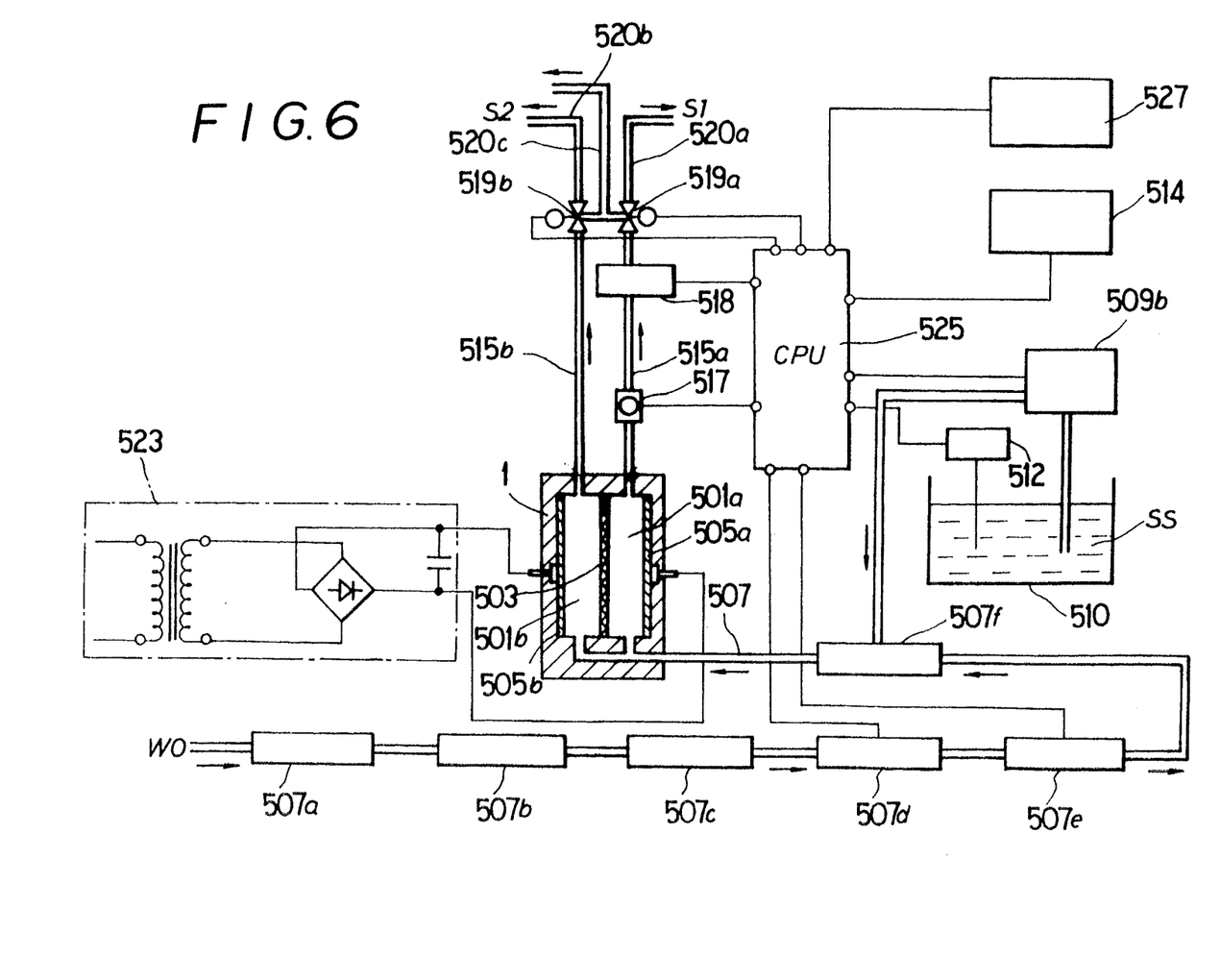
FIG. 6 is a schematic view showing a sixth embodiment of the device of this invention.

The sixth embodiment shown in FIG. 6 is provided with a control system for automatically controlling the electrolytic degree and discharge flow quantity of the acidic water W1 and/or alkaline water W2.

In this embodiment, the raw water WO is supplied to the electrolyzer 1 through a raw water supply passage 507 including a strainer 507a, a reduction valve 507b, a pressure meter 507c, a flow control valve 507d, a flow meter 507e and electrolyte injection means 507f. To the electrolyte injection means 507f, an electrolyte solution SS is fed from an electrolyte tank 510 through a quantitative pump 509b.

The electrolyzer 1 is partitioned into an anode chamber 501a and a cathode chamber 501b by a barrier membrane 503. The anode chamber 501a has an anode electrode 505a, and the cathode chamber 501b has a cathode electrode 505b. Acidic water W1 produced in the anode chamber 501a is discharged through a discharge passage 515a, and alkaline water W2 produced in the cathode chamber 501b is discharged through a discharge passage 515b.

The discharge passage 515 for the acidic water is provided with an ORP sensor 517 for detecting oxidation-reduction potential of the acidic water W1 and a flow meter 518 for detecting the flow quantity of the acidic water W1. The data thus detected by the ORP sensor 517 and the flow meter 518 are given to an arithmetic processor (CPU) 525.

The discharge passages 515a and 515b each have a three-way valve (519a, 519b) which are controlled by the CPU 525. The three-way valves each have a discharge pipe (520a, 520b) and connected in common to a joint pipe 520c.

In the drawing, reference numeral 512 denotes a water gauge for detecting the amount of electrolyte solution SS stored in a tank 510, numeral 514 denotes a display for displaying the measured data, the controlled state and so on, and numeral 523 denotes a power unit for applying an electrolytic current to the anode and cathode electrodes 505a and 505b.

In this embodiment, the three-way valves 519a and 519b are controlled by the CPU 525 in accordance with the oxidation-reduction potential of the acidic water W1 produced in the anode chamber, which is detected by the ORP sensor 517. When the ORP value of the acidic water W1 is too large, the three-way valve 519a is opened, and simultaneously, the three-way valve 519b is throttled, thereby increasing the flow quantity of the water passing through the anode chamber 501a to suppress oxidation-reduction action on the water in the anode chamber. As a result, the acidity of the acidic water W1 discharged from the anode chamber 501a is reduced.

Figure 7:
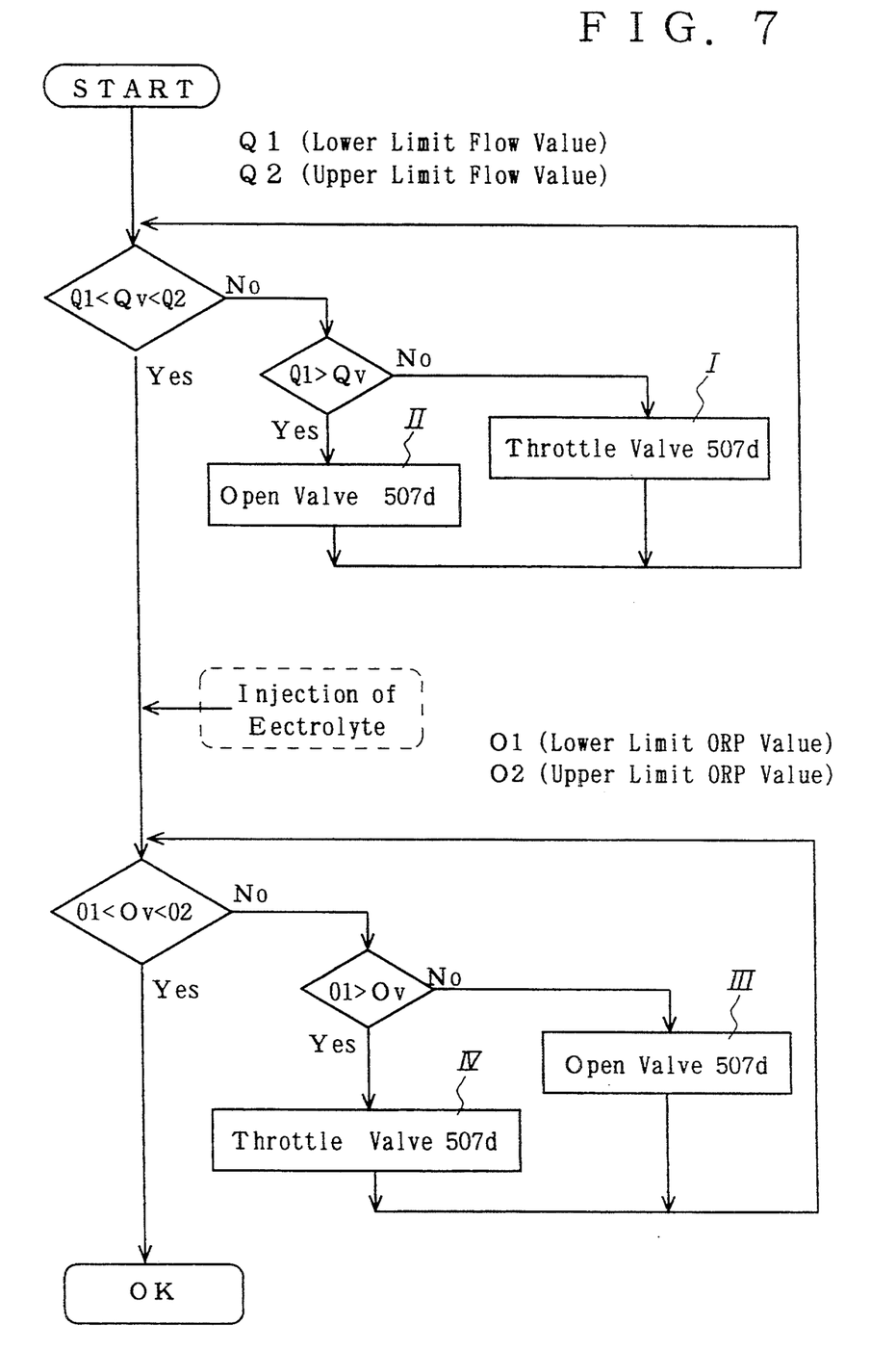
FIG. 7 is a flowchart showing the principle of controlling the flow quantity in the device of FIG. 6.

The optimization of the acidity of the electrolytic water can be mutually carried out by controlling the flow control valve 507d in accordance with the flow quantity of the electrolytic water detected by the flow meter 518, and controlling the three-way valves 519a and 519b in accordance with the oxidation-reduction potential detected by the ORP sensor. To be more specific, as shown by the flowchart of FIG. 7, when the flow quantity Qv of the electrolytic water W1 is lower than the lower limit value Q1 (Q1<Qv), the flow control valve 507d is throttled in the process I. When the flow quantity Qv is higher than the upper limit value Q2 (Q1>Qv), the flow control valve 507d is opened in the process II. Next, the oxidation-reduction potential (ORP) Ov is lower than the lower limit value O1 (O1<Ov), the flow control valve 507d is opened in the process III. When the ORP Ov is higher than the upper limit value O2 (O1>Ov), the flow control valve 507d is throttled in the process IV. Thus, the acidity of the electrolytic water can be optimized to make the acidic water thus obtained available for various purposes.

By operating the three-way valve 519a according to the measured ORP value measured by the ORP sensor 517, only the electrolytic water having the desired electrolytic degree can be obtained stably.

The aforenoted control for producing the electrolytic water can be performed by controlling the addition of the electrolyte solution into the raw water in accordance with the predetermined flow quantity of the raw water or the electrolytic water discharged from the electrolyzer which is detected by the flow meter 518, and simultaneously, finely regulating the flow quantity of the electrolytic water so as to maintain the electrolytic degree of the discharged electrolytic water constant on the basis of the detected signal from the ORP sensor 517.

That is to say, the control of the flow quantity of the raw water or the electrolytic water discharged from the electrolyzer is carried out in such a manner that the predetermined reference flow quantities of the raw water and the electrolytic water are controlled in accordance with the measured values from the flow meters, the injection of the electrolyte solution effected by use of the quantitative pump is controlled with applying the predetermined electric current to the electrolytic electrodes to electrolyze the raw water in the electrolyzer, and the flow quantity of the electrolytic water discharged from the electrolyzer is controlled in accordance with the electrolyzed condition of the electrolytic water in the electrolyzer or the electrolytic degree of the electrolytic water resultantly obtained. Consequently, the electrolytic degree such as electric conductivity, pH value, and oxidation-reduction potential of the electrolytic water can be appropriately maintained within the desired ranges. In addition, since the electric conductivity and pH value of the electrolytic water can be controlled by regulating the flow quantity of the raw water, even the water of a strong acid of less than pH 3 can stably be produced continuously with ease.

Furthermore, by providing flow data setting means 527 connected to the CPU 525, electrolysis effected in the electrolyzer can be controlled by regulating the flow quantities of the raw water and electrolytic water discharged from the electrolyzer and the quantity of the electrolyte solution added to the raw water. In the flow data setting means 527, proper reference data of flow quantity which correspond to the desired quantity of the acidic or alkaline water are preset. Therefore, only by switching the reference data according to the desired quantity of the electrolytic water, the electrolytic water having the desired electrolytic degree can easily be obtained.

Figure 8:
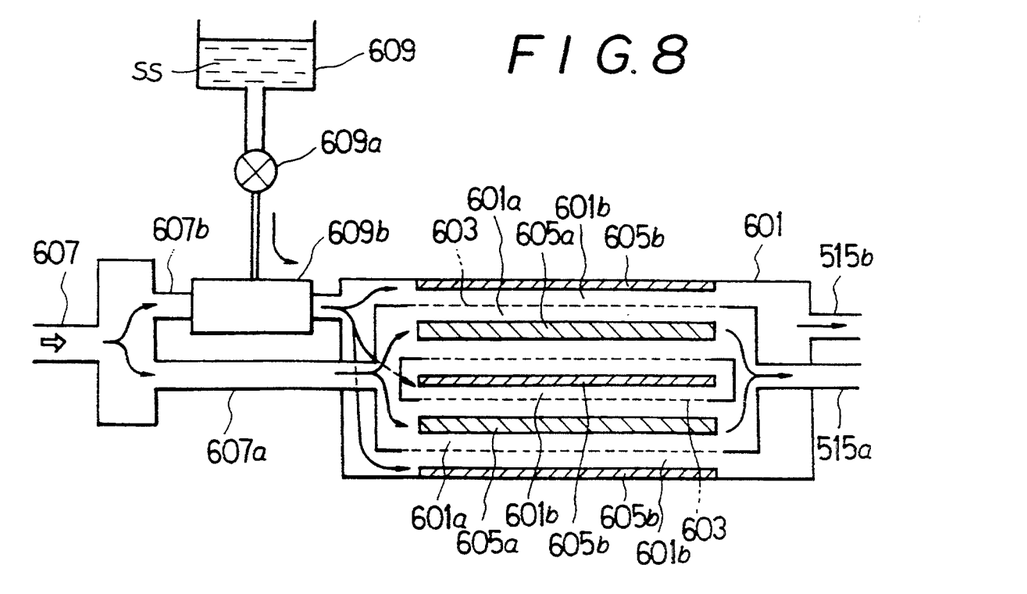
FIG. 8 is a schematic view showing a seventh embodiment in which the electrolyzer used in the device of this invention is modified.

A cylindrical electrolyzer 601 shown in FIG. 8 can be substituted for the electrolyzer 1 used in the foregoing embodiments. This electrolyzer 601 comprises anode chambers 601a and cathode chambers 601b which are arranged coaxially and partitioned by barrier membranes 603. The anode chambers 601a each contain an anode electrode 605a, and the cathode chambers 601b each contain cathode electrode 605b. The raw water supplied through a raw water supply passage 607 is distributed and fed into the anode and cathode chambers 601a and 601b through the respective branch pipes 607a and 607b.

In this embodiment, on the branch pipe 607b, there is disposed an electrolyte injection means 609b for injecting an electrolyte solution SS such as salt water from a tank 609 into the raw water passing through the branch pipe 607b. The injection of the electrolyte solution is controlled by operating a valve 609a. According to this embodiment, effective electrolysis can be accomplished to produce strongly acidic water with high efficiency.

The control of the flow quantity of the raw water to be supplied into the electrolyzer can be executed on the basis of the reference values preset in the arithmetic processor in such a manner that the amount of electricity per unit flow rate of the raw water can be increased by decreasing the flow quantity of the raw water introduced into the anode chamber 601a, to thereby heighten the electrolytic degree. Thus, the electrolytic water of a strong acid having the desired large pH value and high electric conductivity can be obtained.

Similarly, arbitrary quantity of the alkaline water having the desired pH value can be readily produced and discharged from the cathode chamber 601b by opening the three-way valve 609b. This alkaline water may be utilized as drinking water. The production of the alkaline water may be of course controlled by providing an ORP sensor or flow meter on the discharge passage 515b.

As is apparent from the foregoing description, according to the present invention, electrolysis of water can easily be promoted by adding an electrolyte solution to raw water with a small amount of electricity, thereby making it possible to continuously produce a large quantity of electrolytic water having the desired electrolytic degree at a low cost. Furthermore, the electrolytic degree of the electrolytic water such as pH value, electric conductivity (EC value), oxidation-reduction potential (ORP value) and ion concentration can readily be controlled within the desired range with high accuracy by controlling the electrolysis effected in the electrolyzer, the injection of the electrolyte solution, and the flow quantity of the raw water to be supplied into the electrolyzer.

It is to be understood that the invention is not limited in its application to the details of construction and arrangement of parts illustrated in the accompanying drawings, since the invention is capable of other embodiments and of being practiced or carried out in various ways. Also, it is to be understood that the phraselogy or terminology employed herein is for the purpose of description and not of limitation.

What is claimed is:

1. A device for producing electrolytic water having an electrolytic degree, comprising:
    an electrolyzer having at least one anode chamber with an anode electrode and at least one cathode chamber with a cathode electrode, said chambers partitioned from one another by at least one ion-permeable barrier membrane;

a raw water supply passage for supplying raw water into said electrolyzer;

at least one flow control mechanism provided on said raw water supply passage;

means for injecting an electrolyte solution to said raw water flowing through said raw water supply passage;

discharge passages connected to said respective anode and cathode chambers;

at least one flow control mechanism provided on at least one of said discharge passages;

sensor means provided on at least one of said raw water supply passage and discharge passages for detecting an electrolytic degree of at least one of said raw water and said electrolytic water; and a control unit for controlling at least one of said electrolyzer, a supply flow quantity of said raw water, and a discharge flow quantity of said electrolytic water responsive to at least one output signal of said sensor means;

wherein said barrier membrane is movable to move responsive to the electrolytic degree of the electrolytic water discharged from said electrolyzer, to correlatively vary a capacity of each of said anode and cathode chambers.

2. A device for producing electrolytic water having an electrolytic degree, comprising:

an electrolyzer having at least one anode chamber with an anode electrode and at least one cathode chamber with a cathode electrode, said chambers partitioned from one another by at least one ion-permeable barrier membrane;

a raw water supply passage for supplying raw water into said electrolyzer;

at least one flow control mechanism provided on said raw water supply passage;

means for injecting an electrolyte solution to said raw water flowing through said raw water supply passage;

discharge passages connected to said respective anode and cathode chambers;

at least one flow control mechanism provided on at least one of said discharge passages;

sensor means provided on at least one of said raw water supply passage and discharge passages for detecting an electrolytic degree of at least one of said raw water and said electrolytic water; and a control unit for controlling at least one of in said electrolyzer, a supply flow quantity of said raw water, and a discharge flow quantity of said electrolytic water responsive to at least one output signal of said sensor means;

wherein said barrier membrane is movably supported in said electrolyzer by a rotating lever provided at one end with a magnetic yoke which is magnetically attracted by a selected one of plural electromagnets to move said barrier membrane responsive to the electrolytic degree of the electrolytic water discharged from said electrolyzer, to correlatively vary a capacity of each of said anode and cathode chambers.

3. A device for producing electrolytic water having an electrolytic degree, comprising:

an electrolyzer having at least one anode chamber with an anode electrode and at least one cathode chamber with a cathode electrode, said chambers partitioned from one another by at least one ion-permeable barrier membrane;

a raw water supply passage for supplying raw water into said electrolyzer;

at least one flow control mechanism provided on said raw water supply passage;

means for injecting an electrolyte solution to said raw water flowing through said raw water supply passage;

discharge passages connected to said respective anode and cathode chambers;

at least one flow control mechanism provided on at least one of said discharge passages;

sensor means provided on at least one of said raw water supply passage and discharge passages for detecting an electrolytic degree of at least one of said raw water and said electrolytic water; and a control unit for controlling at least one of said electrolyzer, a supply flow quantity of said raw water, and a discharge flow quantity of said electrolytic water responsive to at least one output signal of said sensor means;

wherein one of said anode and cathode chambers is provided with a movable side wall which moves to vary a capacity of the chamber with the movable side wall, to control the electrolytic degree of the electrolytic water discharged from the electrolyzer.

* * * * *